W. J. BAUMGARTNER.
OPERATING CONNECTION.
APPLICATION FILED JUNE 20, 1919.
1,390,482.
Patented Sept. 13, 1921.
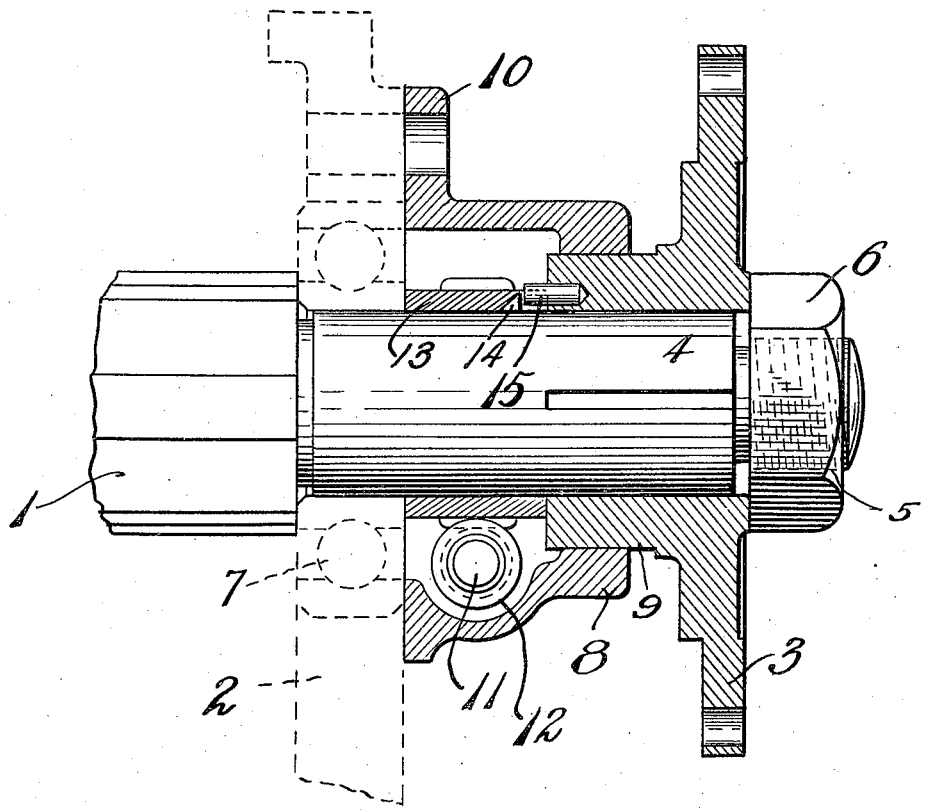
INVENTOR
WALTER J. BAUMGARTNER.
BY
William F. Nickel
ATTORNEY

UNITED STATES PATENT OFFICE.

WALTER J. BAUMGARTNER, OF BROOKLYN, NEW YORK, ASSIGNOR TO DUPLEX ENGINE GOVERNOR COMPANY, INC., OF BROOKLYN, NEW YORK, A CORPORATION OF NEW YORK.

OPERATING CONNECTION.

1,390,482.  Specification of Letters Patent.  Patented Sept. 13, 1921.

Application filed June 20, 1919. Serial No. 305,567.

*To all whom it may concern:*

Be it known that I, WALTER J. BAUMGARTNER, a citizen of the United States, residing in Brooklyn, in the county of Kings and State of New York, have invented certain new and useful Improvements in Operating Connections, of which the following is a specification.

My invention relates to an improved operating connection and method of making same; particularly an operating connection for driving a governor or other accessory of an internal combustion engine from a part actuated by the engine; for example, a shaft on a truck or the like propelled by power which said engine develops.

An object of my invention is to provide an operating connection which is simple in construction; which comprises but few parts; and which requires the smallest possible expenditure of time and labor to mount it in proper position.

A further object of my invention is to provide an operating connection for driving the governor of an internal combustion engine from the propeller end of the change-speed transmission gearing of a truck or similar vehicle propelled by said engine; said connection being adapted to be attached without dismantling the gear-set and without the cutting, shaping or other working of any hard metal portions of the power system or transmission system with which the truck or the like is equipped.

These and other objects and advantages of my invention, will fully appear from the following specification, which is to be taken in connection with the accompanying drawings; and the characteristic features of my invention will be precisely defined in the appended claims. This disclosure, however, is explanatory only, and I may resort to embodiments of my invention other than what is described herein, but within the scope and spirit of my invention as the same as indicated by the general meanings of the terms in which the claims are expressed, and by variations in the wording of same.

On the drawings:—

The figure is a vertical sectional view of an operating connection at the propeller end of the transmission of a motor truck or the like, according to my invention.

The same numerals identify the same parts throughout.

Referring to the drawings, I show at 1 a shaft which is disposed in a casing illustrated in part at 2. This casing in practice incloses the usual change-speed transmission mechanism, comprising adjustable gearing adapted to enable the shaft 1 to be operated at varying speeds by the engine which propels the vehicle that carries said mechanism. The shaft 1 projects through the casing at one end and carries a coupling member 3, made to rotate with the shaft by a suitable key fitting into a key-way 4 in the shaft 1. This member 3 is located between the transmission mechanism and the rear wheels of the vehicle; and the shaft 1 is reduced and threaded, as shown at 5, adjacent the member 3, to receive a nut 6 which acts to hold the member 3 in place on the shaft 1. This coupling member 3 is connected to another coupling member, not shown, on the propeller shaft, which extends backward of the vehicle and is connected to the driving wheels. An anti-friction bearing may be provided for the end of the shaft which projects from the casing 2, as indicated at 7.

Between the casing 2 and the coupling 3 I mount a housing 8, which is open through one end to encircle the hub 9 of the member 3. At its opposite end this housing is provided with one or more portions, such as projections or a continuous flange indicated at 10, and having holes for bolts or other fastening devices to enable it to be secured to the casing 2. It carries therein a transverse shaft 11, below the portion of the shaft 1 which projects through the housing 8, and mounted in suitable bearings in the sides of the housing 8. To this shaft 11 is fixed a worm or spiral gear 12, by which the shaft 11 is driven. This shaft 11 will be connected at one end with the governor of the engine on the vehicle, and when the latter is in motion the governor can be controlled according to the speed of the shaft 1; as will now be set forth.

The housing 8 is also open at the end adjacent the casing 2 and receives a gear 13 which is loosely mounted upon the shaft 1. This gear meshes with the gear 12 and substantially fills the space between the casing 2 and the hub 9 of the member 3. At one point the gear 13 is provided with a recess 14, and into this recess projects a pin 15; fast to the end of the hub 9. Hence, though the gear 13 is loosely mounted upon the shaft 1, the gear 13 will nevertheless rotate when the shaft 1 rotates; because the shaft 1 turns the member 3, and the member 3 will cause the gear 13 to revolve with it. The revolution of the gear 13 turns the gear 12 and hence, motion is imparted to the shaft 11. Of course the gear 12 will be a worm gear and the gear 13 a spiral gear and they will operate, one to turn the other in a manner well known to one skilled in this art.

The merit of this construction resides in the fact that it can be attached to any motor vehicle without one having to work or shape the projecting end of the shaft 1. This shaft is generally made of hardened steel; and if the gear 13, instead of being slipped over the end of the shaft 1 and loosely mounted on same, were to be splined to this shaft, the shaft would have to be subjected to a grinding operation; and for that reason the gear-set in the casing 2 would have to be dismantled to permit the shaft 1 to be removed; even if nothing more were done than to extend the key-way for the key indicated at 4 in far enough to enable a single key to serve for the coupling 3 and member 13. Instead of such operation, I need only make the recess shown at 14 in the gear 13, and this recess can be cut or cast in while the gear is being manufactured and before it is finally hardened. The coupling 3 is seldom hardened and a hole can easily be bored in the hub 9 thereof for the pin 15.

Therefore, in order to attach the operating connection for the governor, all that has to be done is to remove the nut 6 and take off the coupling 3. A hole is then bored in the hub 9 thereof, and the pin 15 inserted. Before the coupling 3 is replaced on the shaft 1, the recessed gear 13 is slipped over the same, and the housing 8 applied and fastened to the casing 2. Next the coupling 3 is put back on the shaft and caused to engage through the pin 15 with the recessed gear 13. Then the coupling 3 is once more connected to the propeller shaft and the work of installing the connection for the governor is completed.

From the foregoing the simplicity of my construction and the readiness with which the same can be attached to a moving part of the vehicle will be apparent. The connection consists of but few parts, and the mounting of same is very easy and convenient; requiring no cutting of hardened metal or taking apart to any great extent of the driving mechanism of the vehicle.

Having described my invention what I believe to be new and desire to secure and protect by Letters Patent of the United States is:—

1. The combination of a casing, a shaft disposed in said casing and projecting therefrom, a coupling member on said shaft and rotatable therewith, a housing between said casing and said coupling; and a gear loosely mounted on said shaft in said housing and engaged by said coupling member to rotate with same.

2. The combination of a shaft, a gear loosely mounted thereon, a housing inclosing said gear, a coupling rigid with the shaft, and projecting into the housing and engaging said gear to turn same, and a gear to be operated by said first-named gear in said housing.

3. The combination of a casing, a shaft mounted in said casing and projecting therefrom, a gear loosely mounted on the shaft, a housing inclosing the gear, a coupling rigid with the shaft and having a hub extending into the housing, said hub engaging the gear to rotate the same, and a second gear to be actuated by said first-named gear in said housing.

4. The combination of a casing, a shaft mounted in said casing and projecting therefrom, a gear loosely mounted on the shaft and having a recess, a housing inclosing said gear and supported by the casing, a coupling rigid with the shaft and having a hub extending into the housing, said hub having a pin to project into the recess of said gear and engage the same, and a second gear to be actuated by the first named gear in said housing.

5. The combination of a shaft, a gear loosely mounted thereon, a coupling rigid with the shaft and engaging the gear to turn the same, and a second gear adjacent said shaft to be operated by the first named gear thereon.

In testimony whereof, I have signed my name to this specification this 13th day of June, 1919.

WALTER J. BAUMGARTNER.